United States Patent
Lee et al.

(10) Patent No.: US 10,847,034 B2
(45) Date of Patent: Nov. 24, 2020

(54) APPARATUS AND METHOD FOR CONTROLLING LANE CHANGE FOR VEHICLE

(71) Applicants: HYUNDAI MOTOR COMPANY, Seoul (KR); KIA MOTORS CORPORATION, Seoul (KR)

(72) Inventors: Dong Hwi Lee, Seongnam-si (KR); Tae Sung Choi, Hwaseong-si (KR); Jun Soo Kim, Seoul (KR); Su Jung Yoo, Incheon (KR); Hyun Ju Kim, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 50 days.

(21) Appl. No.: 16/046,082

(22) Filed: Jul. 26, 2018

(65) Prior Publication Data

US 2019/0180625 A1   Jun. 13, 2019

(30) Foreign Application Priority Data

Dec. 7, 2017 (KR) .................. 10-2017-0167645

(51) Int. Cl.
*G08G 1/16* (2006.01)
*G05D 1/02* (2020.01)
*G01S 19/42* (2010.01)

(52) U.S. Cl.
CPC .............. *G08G 1/167* (2013.01); *G01S 19/42* (2013.01); *G05D 1/0212* (2013.01); *G05D 1/0238* (2013.01); *G05D 1/0246* (2013.01); *G05D 1/0257* (2013.01); *G05D 1/0278* (2013.01); *G05D 2201/0213* (2013.01)

(58) Field of Classification Search
CPC .... G08G 1/167; G05D 1/0212; G05D 1/0257; G05D 1/0246; G05D 1/0278; G05D 1/0238; G05D 2201/0213; G01S 19/42; G01S 19/14
See application file for complete search history.

(56) References Cited

U.S. PATENT DOCUMENTS

2017/0261989 A1*  9/2017  Ishioka ............... B60W 30/095
2018/0240345 A1*  8/2018  So .......................... G08G 1/166

* cited by examiner

*Primary Examiner* — Nadeem Odeh
*Assistant Examiner* — Michael V Kerrigan
(74) *Attorney, Agent, or Firm* — Morgan, Lewis & Bockius LLP

(57) ABSTRACT

An apparatus for controlling a lane change in a vehicle includes a navigation module for guiding a user along a path from a starting point to a destination point, a GPS module, a memory, a first sensor, a second sensor, and a processor for being electrically connected with the navigation module, the GPS module, the memory, the first sensor, and the second sensor. The processor determines whether it is possible to control a lane change to a target lane in the path based on a length of a diverging lane in a diverging section or a length of a merging lane in a merging section in the diverging section or the merging section included in the path, controls the lane change to the target lane, and controls the vehicle to travel along a lane link connected with the target lane.

20 Claims, 9 Drawing Sheets

APPARATUS AND METHOD FOR CONTROLLING LANE CHANGE FOR VEHICLE

CROSS-REFERENCE TO RELATED APPLICATION

This application is based on and claims the benefit of priority to Korean Patent Application No. 10-2017-0167645, filed on Dec. 7, 2017, in the Korean Intellectual Property Office, the disclosure of which is incorporated herein in its entirety by reference.

TECHNICAL FIELD

The present disclosure relates to an apparatus and method for controlling a vehicle to change a lane in a diverging section and a merging section.

BACKGROUND

With the development of the auto industry, a lane change control system capable of automatically changing a lane where a vehicle is traveling has been developed. When a driver operates a turn signal with the intention of changing a lane, the lane change control system may perform a lane change by automatically controlling a vehicle in a lateral direction toward a direction where the turns signal is turned on. The lane change control system may perform a lane change by determining whether a speed, a location, and the like of an ambient vehicle are suitable for performing a lane change, setting a control path for the lane change, and controlling steering torque along the control path. The lane change control system may perform a lane change to exit through a diverging road or enter a merging road.

There is a need for a lane change method different from a typical method such that a vehicle may move to a diverging lane connected with a diverging road or may move from a merging lane connected with a merging road to a mainline lane. When a length of a diverging section or a merging section is short or when traffic of a diverging lane or a merging lane is high, it may be difficult for a vehicle to change a lane using a typical system. A conventional lane change system may recognize a lane using its camera and may perform a lane change based on the recognized lane. In this case, it may be difficult for the vehicle to determine whether the recognized lane is located in a diverging section or a merging section.

SUMMARY

The present disclosure has been made to solve the above-mentioned problems occurring in the prior art while advantages achieved by the prior art are maintained intact.

An aspect of the present disclosure provides an apparatus and method for controlling a lane change in a vehicle to establish various lane change strategies in a diverging section and a merging section using a precise map database (DB).

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling a lane change in a vehicle may include: a navigation module for providing a user a path from a starting point to a destination point, a global positioning system (GPS) module for obtaining location information of the vehicle, a memory storing a precise map database (DB), a first sensor for obtaining information about a periphery of the vehicle, a second sensor for obtaining information about the vehicle, and a processor electrically connected with the navigation module, the GPS module, the memory, the first sensor, and the second sensor. The processor may be configured to determine whether it is possible to control the vehicle to change a lane to a target lane in the path based on a length of a diverging lane in a diverging section included in the path or a length of a merging lane in a merging section included in the path, when it is possible to control the vehicle to change the lane, control the lane change to the target lane, and, when it is impossible to control the vehicle to change the lane, control the vehicle to travel along a lane link connected with the target lane.

According to an embodiment, the processor may be further configured to determine the target lane based on the path and the precise map DB and, when the path is connected with the diverging lane or the merging lane, determine whether it is possible to control the vehicle to change the lane to the target lane.

According to an embodiment, when the vehicle is located in the diverging section, the target lane may be the diverging lane. When the vehicle is located in the merging section, the target lane may be a lane adjacent to the merging lane.

According to an embodiment, the processor may be further configured to, when the vehicle is located in the diverging section, determine whether it is possible to control the vehicle to change the lane to the target lane based on the length of the diverging lane and traffic of the diverging lane.

According to an embodiment, the processor may be further configured to, when the vehicle enters a section including the diverging lane and is located in the diverging section, and when it is possible to control the vehicle to change the lane, change the lane from a lane adjacent to the diverging lane to the diverging lane.

According to an embodiment, the processor may be further configured to, when the vehicle is located in the diverging section and when it is impossible to control the vehicle to change the lane, control the vehicle to travel along the lane link which connects a lane adjacent to the diverging lane with the diverging lane.

According to an embodiment, the processor may be further configured to, when the vehicle is located in the merging section and when it is possible to control the vehicle to change the lane, control the vehicle to change the lane from the merging lane to a lane adjacent to the merging lane.

According to an embodiment, the processor may be further configured to, when the vehicle is located in the merging section and when it is impossible to control the vehicle to change the lane, generate the lane link which connects the merging lane with a lane adjacent to the merging lane and control the vehicle to travel along the generated lane link.

According to an embodiment, the processor may be further configured to determine whether it is possible to control the vehicle to change the lane to the target lane using the first sensor and the second sensor.

According to an embodiment, the first sensor may include at least a portion of a camera, a radar, or a light detection and ranging (LIDAR).

According to an embodiment, the second sensor may include at least a portion of an acceleration sensor, a yaw rate sensor, or a wheel speed sensor.

According to another aspect of the present disclosure, a method for controlling a lane change in a vehicle may include: generating a path from a starting point to a destination point, determining, by a processor, whether it is possible to control the vehicle to change a lane to a target lane in the path based on a length of a diverging lane in a diverging section included in the path or a length of a merging lane in a merging section included in the path, and, when it is possible to control included in the path the lane, controlling the lane change to the target lane and, when it is impossible to control included in the path the lane, controlling the vehicle to travel along a lane link connected with the target lane.

According to an embodiment, the determining may include determining the target lane based on the path and a precise map DB and, when the path is connected with the diverging lane or the merging lane, determining whether it is possible to control included in the path the lane to the target lane.

According to an embodiment, when the vehicle is located in the diverging section, the target lane may be the diverging lane. When the vehicle is located in the merging section, the target lane may be a lane adjacent to the merging lane.

According to an embodiment, the step of determining may include, when the vehicle is located in the diverging section, determining whether it is possible to control included in the path the lane to the target lane based on a length of the diverging lane and traffic of the diverging lane.

According to an embodiment, the step of controlling may include, when the vehicle is located in the diverging section and when it is possible to control included in the path the lane, changing the lane change from a lane adjacent to the diverging lane to the diverging lane when the vehicle enters a section including the diverging lane.

According to an embodiment, the step of controlling may include, when the vehicle is located in the diverging section and when it is impossible to control included in the path the lane, controlling the vehicle to travel along the lane link which connects a lane adjacent to the diverging lane with the diverging lane.

According to an embodiment, the step of controlling may include, when the vehicle is located in the merging section and when it is possible to control included in the path the lane, controlling the lane change from the merging lane to a lane adjacent to the merging lane.

According to an embodiment, the step of controlling may include, when the vehicle is located in the merging section and when it is impossible to control included in the path the lane, generating the lane link which connects the merging lane with a lane adjacent to the merging lane and controlling the vehicle to travel along the generated lane link.

According to an embodiment, the step of determining may include determining whether it is possible to control included in the path the lane to the target lane using sensing information about a periphery of the vehicle and sensing information about the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings. In adding reference denotations to elements of each drawing, although the same elements are displayed on a different drawing, it should be noted that the same elements have the same denotations. In addition, in describing an embodiment of the present disclosure, if it is determined that a detailed description of related well-known configurations or functions blurs the gist of an embodiment of the present disclosure, it will be omitted.

In describing elements of embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
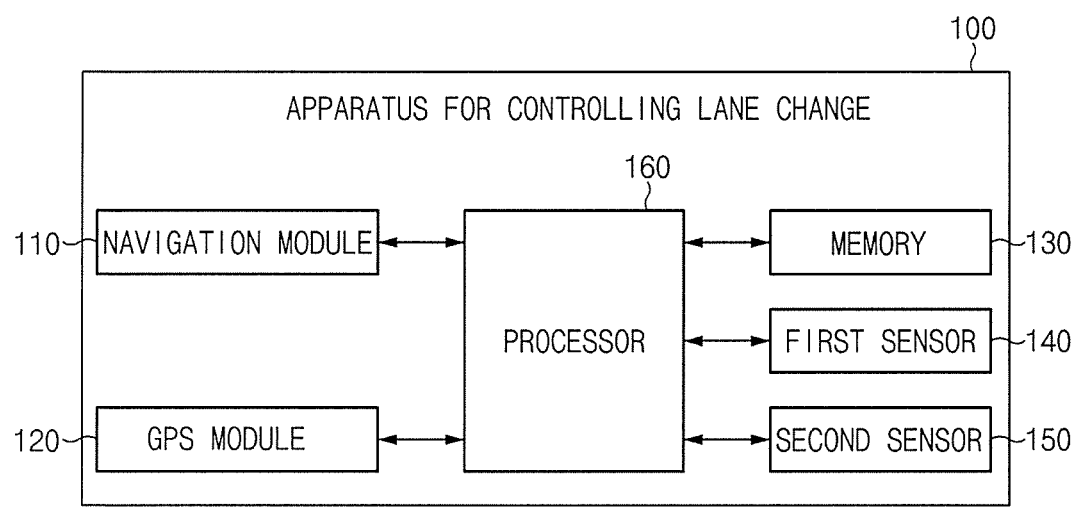
FIG. 1 is a block diagram illustrating a configuration of an apparatus for controlling a lane change in a vehicle according to an embodiment of the present disclosure.

FIG. 1 is a block diagram illustrating a configuration of an apparatus for controlling a lane change in a vehicle according to an embodiment of the present disclosure.

Referring to FIG. 1, an apparatus 100 for controlling a lane change in a vehicle (hereinafter referred to as "apparatus 100") may include a navigation module 110, a global positioning system (GPS) module 120, a non-transitory memory 130, a first sensor 140, a second sensor 150, and a processor 160. The apparatus 100 of FIG. 1 may be mounted on a vehicle. The apparatus 100 may provide a strategy for a lane change in a diverging section or a merging section using the above-mentioned elements.

The navigation module 110 may guide a user along a path from a starting point to a destination point. For example, the navigation module 110 may obtain a path from a current location obtained by the GPS module 120 to a destination point input by the user and may provide a guide which follows the obtained route to the user. The navigation module 110 may guide the user along a path using a precise map database (DB) stored in the memory 130.

The GPS module 120 may obtain location information of the vehicle. The GPS module 120 may receive a GPS signal and may calculate a current location of the vehicle based on the received signal. The current location of the vehicle may be calculated by the processor 160.

The memory 130 may store data used by an element of the apparatus 100. The memory 130 may store instructions and/or a DB for executing operations performed by the processor 160. For example, the memory 130 may store the precise map DB.

The first sensor 140 may obtain information about a periphery of the vehicle on which the apparatus 100 is mounted. The first sensor 140 may obtain information about a vehicle, a lane, or the like around the vehicle on which the apparatus 100 is mounted. According to an embodiment, the first sensor 140 may include at least a portion of a camera, a radar, or a light detection and ranging (LIDAR).

The second sensor 150 may obtain information about the vehicle on which the apparatus 100 is mounted. The second sensor 150 may obtain information about acceleration, a yaw rate, a wheel speed, and/or the like of the vehicle. According to an embodiment, the second sensor 150 may include at least a portion of an acceleration sensor, a yaw rate sensor, or a wheel speed sensor.

The processor 160 may be electrically connected with the navigation module 110, the GPS module 120, the memory 130, the first sensor 140, and the second sensor 150. The processor 160 may control the navigation module 110, the GPS module 120, the memory 130, the first sensor 140, and the second sensor 150 and may perform a variety of data processing and various arithmetic operations.

According to an embodiment, the processor 160 may determine whether it is possible to control the vehicle to change a lane to a target lane in a path based on a length of a diverging lane in a diverging section or a length of a merging lane in a merging section in the diverging section or the merging section included in the path. The processor 160 may determine whether it is possible to control the vehicle to change a lane using the precise map DB. The processor 160 may determine a target lane based on a path and the precise map DB. When the path is connected with a diverging lane or a merging lane, the processor 160 may determine whether it is possible to control the vehicle to change a lane to a target lane. For example, when the vehicle is located in a diverging section, the target lane may be a diverging lane. For another example, when the vehicle is located on a merging section, the target lane may be a lane adjacent to a merging lane. According to an embodiment, the processor 160 may determine whether it is possible to control the vehicle to change a lane to a target lane using the first sensor 140 and the second sensor 150.

According to an embodiment, when the vehicle is located in a diverging section, the processor 160 may determine whether it is possible to control the vehicle to change a lane to a target lane based on a length of a diverging lane and traffic of the diverging lane. When the vehicle is located in a diverging section and when it is possible to control the vehicle to change a lane, the processor 160 may control the lane change to a diverging lane. When the vehicle is located in a diverging section and when it is possible to control the vehicle to change the lane, the processor 160 may control the lane change from a lane adjacent to a diverging lane to the diverging lane when the vehicle enters a section including the diverging lane.

According to an embodiment, when the vehicle is located in a merging section, the processor 160 may determine whether it is possible to control the vehicle to change a lane to a target lane based on a length of a merging lane. When the vehicle is located in the merging section and when it is possible to control the vehicle to change the lane, the processor 160 may control the lane change to a mainline lane. According to an embodiment, when the vehicle is located in the merging section and when it is possible to control the vehicle to change the lane, the processor 160 may control the lane change from a merging lane to a lane adjacent to the merging lane.

According to an embodiment, when it is impossible to control the vehicle to change a lane, the processor 160 may control the vehicle to travel along a lane link connected with a target lane. According to an embodiment, when the vehicle is located in a diverging section and when it is impossible for the processor 160 to control the vehicle to change a lane, the processor 160 may control the vehicle to travel along a lane link which connects a lane adjacent to a diverging lane with the diverging lane. The processor 160 may control the vehicle to move to a diverging lane using a lane center following logic rather than a lane change logic.

According to an embodiment, when the vehicle is in a merging section and when it is impossible for the processor 160 to control the vehicle to change a lane, the processor 160 may generate a lane link which connects a merging lane with a lane adjacent to the merging lane and may control the vehicle to travel along the generated lane link. The processor 160 may control the vehicle to move to a mainline line adjacent to a merging line using the lane center following logic rather than the lane change logic.

Figure 2:
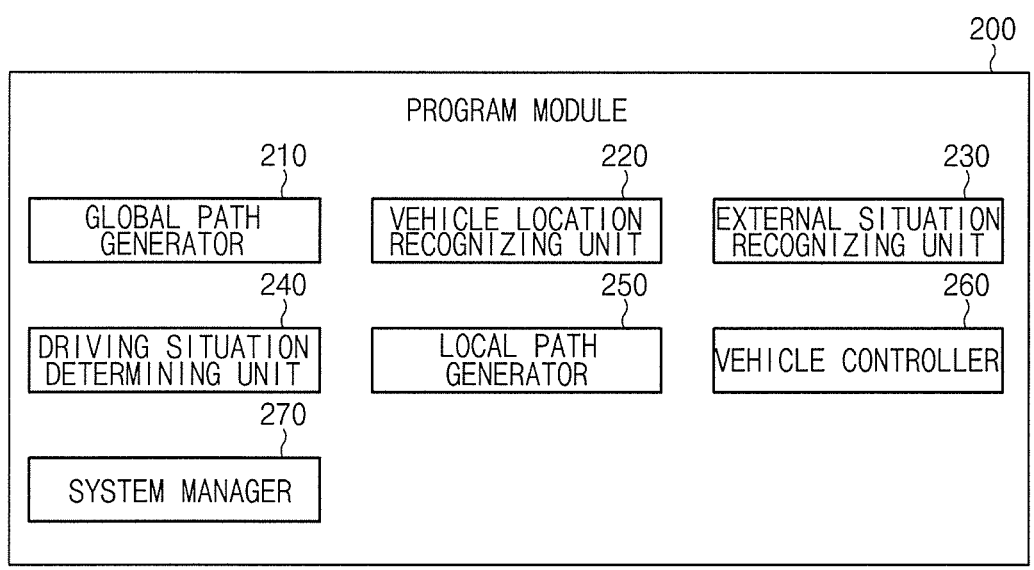
FIG. 2 is a block diagram illustrating a configuration of a program module included in an apparatus for controlling a lane change in a vehicle according to an embodiment of the present disclosure.

FIG. 2 is a block diagram illustrating a configuration of a program module included in an apparatus for controlling a lane change in a vehicle according to an embodiment of the present disclosure.

Referring to FIG. 2, a program module 200 according to an embodiment may include a global path generator 210, a vehicle location recognizing unit 220, an external situation recognizing unit 230, a driving situation determining unit 240, a local path generator 250, a vehicle controller 260, and a system controller 270.

The global path generator 210 may generate a path from a starting point to a destination point. The global path generator 210 may generate a path using a precise map DB.

The vehicle location recognizing unit 220 may accurately recognize a location of a vehicle based on the precise map DB using precise positioning technology.

The external situation recognizing unit 230 may recognize an ambient vehicle using a first sensor 140 of FIG. 1, which obtains information about the outside of the vehicle, and the precise map DB.

The driving situation determining unit 240 may analyze an average speed in a lane and traffic information of the lane using information obtained by the external situation recognizing unit 230 and may determine a time of a lane change.

The local path generator 250 may generate a path for avoidance driving in a lane and for a lane change upon control of a lane change.

The vehicle controller 260 may generate a steering control signal for lateral control and may generate a vehicle acceleration signal for longitudinal control.

The system manager 270 may be responsible for a transition strategy between a driver and a system. The system manager 270 may generate a control activation button and may generate a warning signal upon a fault.

Figure 3:
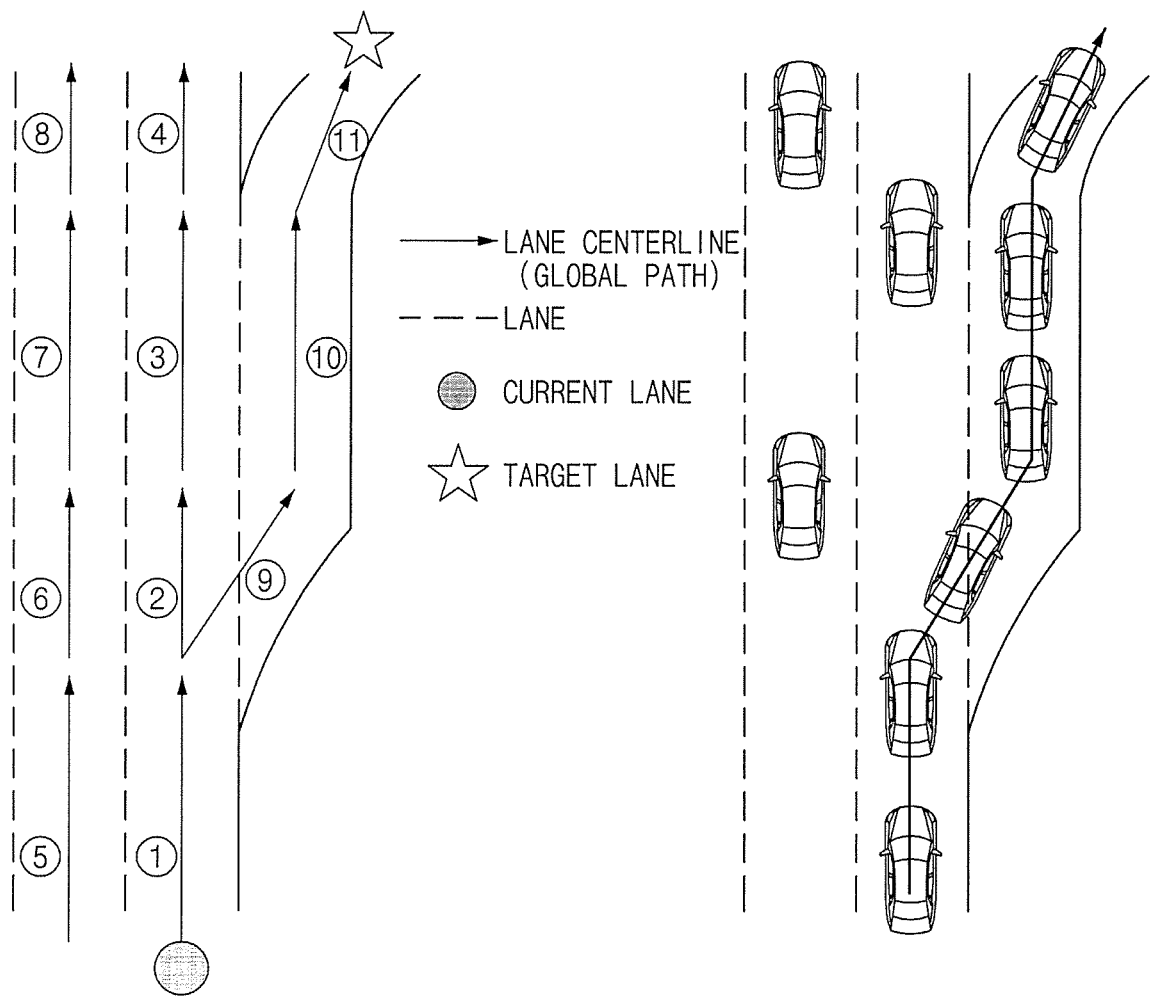
FIG. 3 is a drawing illustrating an exemplary operation of an apparatus for controlling a lane change in a vehicle according to an embodiment of the present disclosure.

FIG. 3 is a drawing illustrating an exemplary operation of an apparatus for controlling a lane change in a vehicle according to an embodiment of the present disclosure.

Referring to FIG. 3, a vehicle according to an embodiment may travel on a second lane of a roadway including a diverging section. For example, the vehicle may be located on lane link ①. In principle, the vehicle may travel along a local path generated by a local path generator based on information about the lane link. The vehicle may basically control a lane change along a local path.

In FIG. 3, an arrow may indicate a lane link. The lane link may be divided to distinguish a shape of a roadway. For example, a lane link of another straight lane may be divided into the same level (e.g., lane links ①, ②, ③, and ④) to display lane links ⑨, ⑩, and ⑪ of a diverging lane.

According to an embodiment, the vehicle may determine whether it is possible to control the vehicle to change a lane to a diverging lane based on a length of the diverging lane and traffic of the diverging lane in a diverging section. When the length of the diverging lane (e.g., lane link ⑩) is sufficiently long and when traffic of the diverging lane is low, the vehicle may determine that it is possible to control the vehicle to change the lane to the diverging lane. In this case, the vehicle may control a lane change from lane link ③ to the diverging lane. The vehicle may travel in an order of, for example, lane link ①, lane link ②, lane link ③, control of a lane change, lane link ⑩, and lane link ⑪.

According to an embodiment, when the length of the diverging lane is short and when the traffic of the diverging lane is high, the vehicle may determine that it is impossible to control the vehicle to change the lane to the diverging lane. For example, when the length of the diverging lane (e.g., lane link ⑩) is short, it may be difficult to control a lane change from lane link ③ to lane link ⑩. When the traffic of the diverging lane is high, the vehicle may interpose itself between other waiting vehicles on the diverging lane when controlling a lane change from lane link ③ and to lane link ⑩. Thus, in this case, the vehicle may travel along lane link ⑨ without controlling the lane change. For example, the vehicle may travel in an order of lane link ①, lane link ⑨, lane link ⑩, and lane link ⑪ like it follows a centerline without controlling a lane change.

Figure 4:
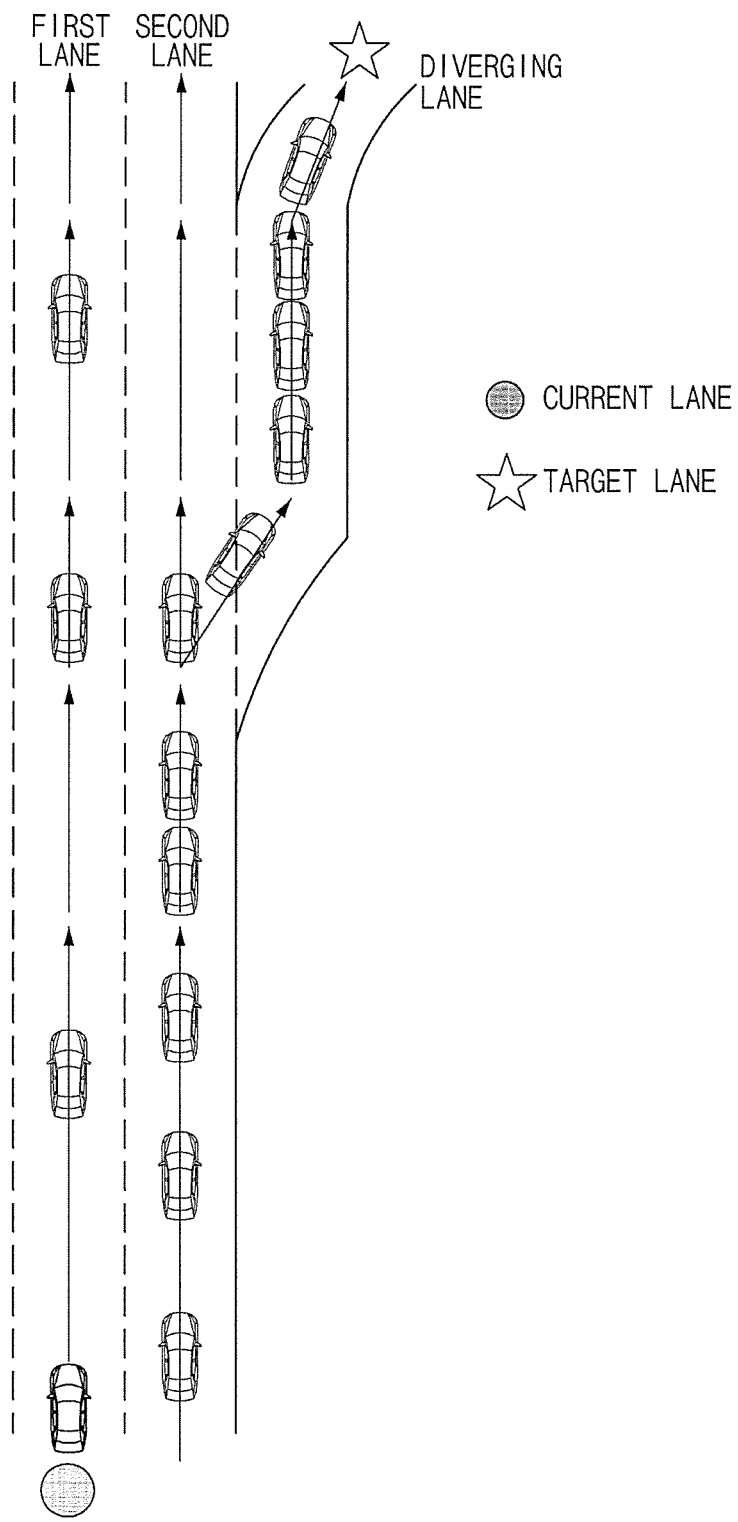
FIG. 4 is a drawing illustrating an exemplary operation of an apparatus for controlling a lane change in a vehicle according to an embodiment of the present disclosure.

FIG. 4 is a drawing illustrating an exemplary operation of an apparatus for controlling a lane change in a vehicle according to an embodiment of the present disclosure.

Referring to FIG. 4, a vehicle according to an embodiment may travel on a first lane of a roadway including a diverging section. A target lane in a global path may be a diverging lane. The first lane may have low traffic, and a second lane may have high traffic. For example, an average speed of the first lane may be 100 km/h, and an average speed of the second lane may be 30 km/h. The vehicle should perform a lane change to the second lane to enter the diverging lane. The vehicle may advance a time when controlling a lane change to the second lane based on the result of analyzing traffic. The vehicle may determine that it is impossible to control the vehicle to change a lane to the diverging lane based on traffic and may travel along a lane link which connects the second lane with the diverging lane without controlling the lane change.

Figure 5:
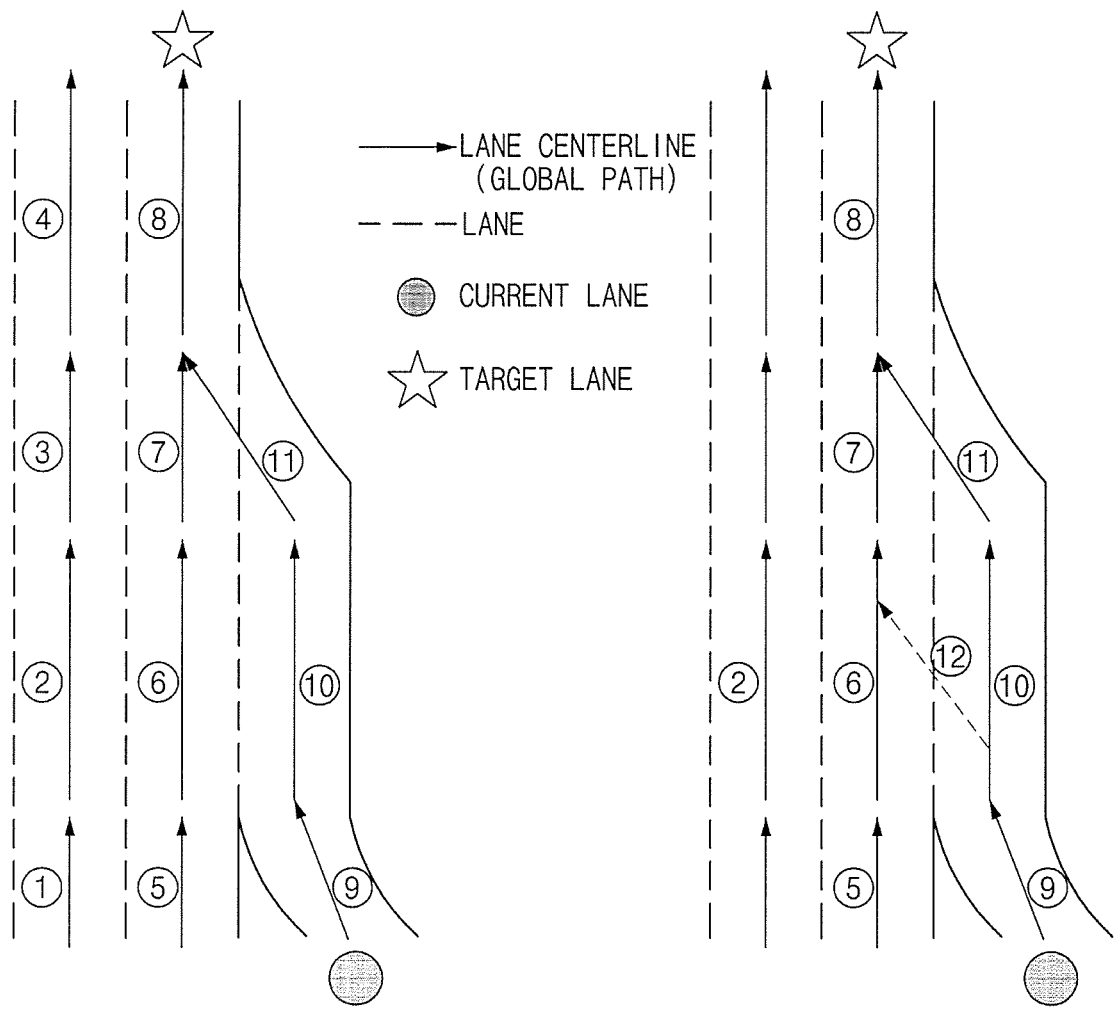
FIG. 5 is a drawing illustrating an exemplary operation of an apparatus for controlling a lane change in a vehicle according to an embodiment of the present disclosure.

FIG. 5 is a drawing illustrating an exemplary operation of an apparatus for controlling a lane change in a vehicle according to an embodiment of the present disclosure.

Referring to FIG. 5, a vehicle according to an embodiment may travel on a merging lane of a roadway including a merging section. For example, the vehicle may be located on lane link ⑨. In principle, the vehicle may travel along a path generated by a local path generator based on information about a lane link. In principle, the vehicle may control a lane change along a local path.

According to an embodiment, the vehicle may determine whether it is possible to control the vehicle to change a lane to a lane of a mainline adjacent to a merging lane based on a length of the merging lane in the merging section. When the length of the merging lane (e.g., lane link ⑩) is sufficiently long, the vehicle may determine that it is possible to control the vehicle to change a lane to the mainline. In this case, the vehicle may control a lane change from lane link ⑩ to a second lane which is a target lane. The vehicle may travel in an order of, for example, lane link ⑨, lane link ⑩, control of a lane change, lane link ⑥, lane link ⑦, and lane link ⑧.

According to an embodiment, when the length of the merging lane is short, the vehicle may determine that it is impossible to control the vehicle to change a lane to a lane of the mainline adjacent to the merging lane. For example, when the length of the merging lane (e.g., lane link 10) is short, it may be difficult to control a lane change from lane link 10 to lane link 6. Thus, in this case, the vehicle may generate lane link 12 which is not included in a precise map DB, without using a lane change logic. The vehicle may travel along the generated lane link 12. The vehicle may travel in an order of, for example, lane link 9, lane link 10, lane link 12, lane link 6, lane link 7, and lane link 8 like it follows a centerline without using the lane change logic.

Hereinafter, a description will be given of a difference between when the vehicle controls a lane change and when the vehicle follows a lane link with reference to FIG. 6.

Figure 6:
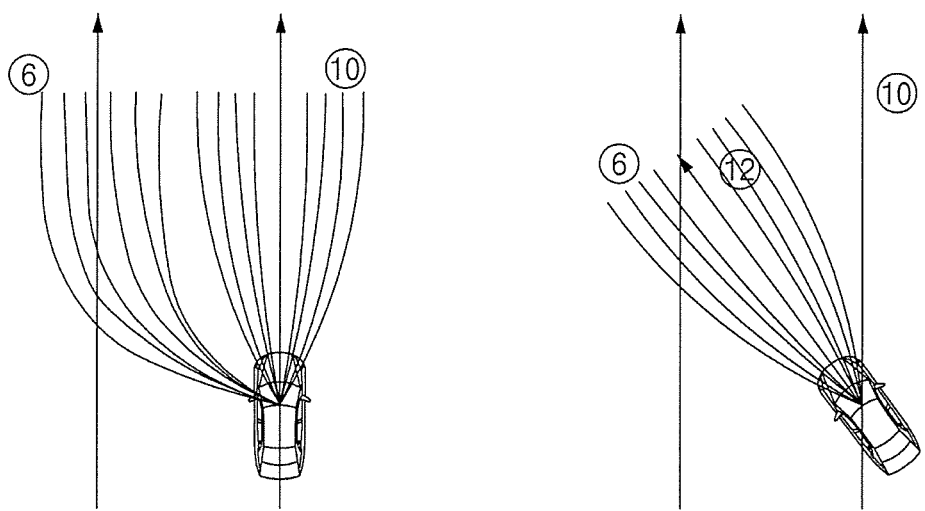
FIG. 6 is a drawing illustrating an exemplary operation of an apparatus for controlling a lane change in a vehicle according to an embodiment of the present disclosure.

FIG. 6 is a drawing illustrating an exemplary operation of an apparatus for controlling a lane change in a vehicle according to an embodiment of the present disclosure.

Referring to FIG. 6, a vehicle according to an embodiment may travel on lane link ⑩. A target lane of the vehicle may be a lane including lane link ⑥. When it is possible to control the vehicle to change a lane, the vehicle may determine situations of a current lane and the target lane using a lane change logic and may generate a local path, thus controlling its behavior along the local path.

It is impossible to control the vehicle to change a lane, the vehicle may generate lane link ⑫ which connects lane link ⑩ with lane link ⑥ and may travel along lane link ⑫ using a center following logic without using the lane change logic (i.e., without generating a local path). The vehicle may change a direction to face lane link ⑥ along lane link ⑫ as soon as the vehicle enters lane link ⑫, thus more easily entering lane link ⑥.

Figure 7:
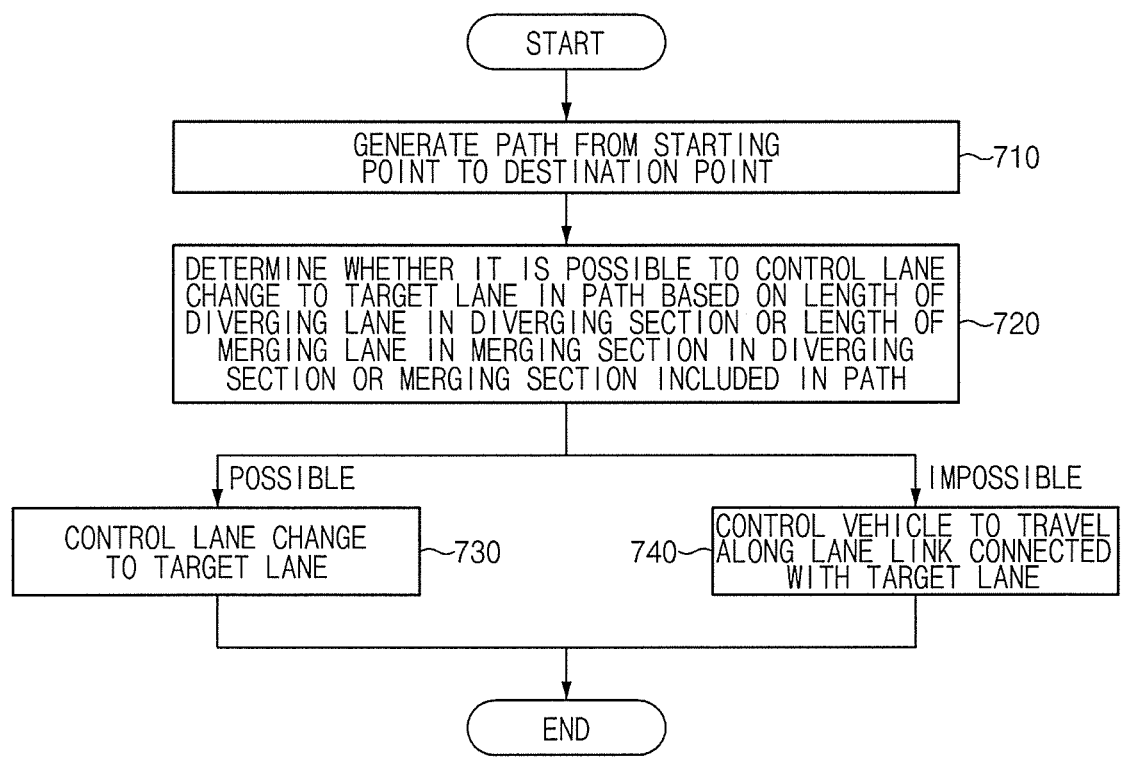
FIG. 7 is a flowchart illustrating a method for controlling a lane change in a vehicle according to an embodiment of the present disclosure.

FIG. 7 is a flowchart illustrating a method for controlling a lane change in a vehicle according to an embodiment of the present disclosure.

Hereinafter, it may be assumed that an apparatus 100 of FIG. 1 performs a process of FIG. 7. Further, in a description with reference to FIG. 7, an operation described as being performed by an apparatus may be understood as being controlled by a processor 160 of the apparatus 100.

Referring to FIG. 7, in operation 710, the apparatus may generate a path from a starting point to a destination point. For example, the apparatus may generate a path for traveling from a current location of a vehicle to a destination point requested by a user using a precise map DB.

In operation 720, the apparatus may determine whether it is possible to control the vehicle to change a lane to a target lane in the path based on a length of a diverging lane in a diverging section or a length of a merging lane in a merging section in the diverging section or the merging section included in the path. For example, the apparatus may determine whether it is possible to control the vehicle to change a lane from a mainline lane to the diverging lane and may determine whether it is possible to control the vehicle to change a lane from the merging lane to the mainline lane. The apparatus may consider traffic of a lane for determination.

When it is possible to control the vehicle to change the lane, in operation 730, the apparatus may control a lane change to the target lane. For example, the apparatus may generate a local path using a lane change logic and may control a lane change along the local path.

When it is impossible to control the vehicle to change the lane, in operation 740, the apparatus may travel along a lane link connected with the target lane. For example, the apparatus may travel along a lane link connected with the target lane using a center following logic. The apparatus may generate a lane link connected with the target lane and may travel along the generated lane link using the center following logic.

Figure 8:
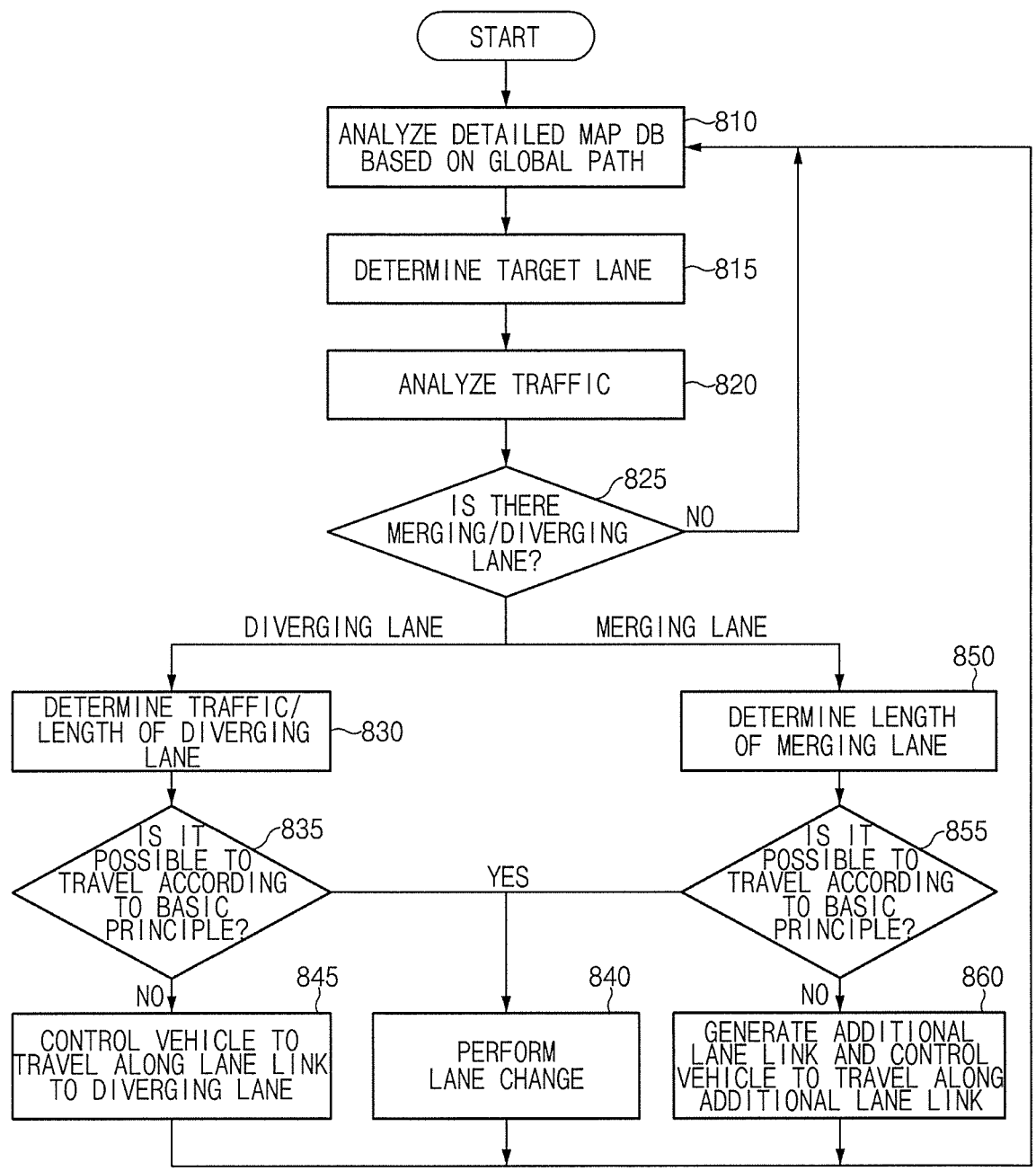
FIG. 8 is a flowchart illustrating a method for controlling a lane change in a vehicle according to an embodiment of the present disclosure.

FIG. 8 is a flowchart illustrating a method for controlling a lane change in a vehicle according to an embodiment of the present disclosure.

Hereinafter, it may be assumed that an apparatus 100 of FIG. 1 performs a process of FIG. 8. Further, in a description with reference to FIG. 8, an operation described as being performed by an apparatus may be understood as being controlled by a processor 160 of the apparatus 100.

Referring to FIG. 8, in operation 810, the apparatus may analyze a precise map DB based on a global path. For example, the apparatus may compare the global path with the precise map DB.

In operation 815, the apparatus may determine a target lane. For example, the apparatus may determine a path where a vehicle will be travel 5 km ahead of the vehicle by analyzing the global path and the precise map DB.

In operation 820, the apparatus may analyze traffic. For example, the apparatus may analyze traffic of each lane by calculating an average speed of each lane.

In operation 825, the apparatus may determine whether there is a merging lane or a diverging lane. For example, the apparatus may determine whether there is the merging lane or the diverging lane within a specific distance.

When there is the diverging lane, in operation 830, the apparatus may determine per-lane traffic and a length of the diverging lane. For example, the apparatus may determine the length of the diverging lane using a length value of a lane link included in the precise map DB and may determine whether traffic of the diverging lane is higher than that of another lane.

In operation 835, the apparatus may determine whether it is possible for a vehicle on which the apparatus is mounted to travel according to a basic principle. For example, the apparatus may determine whether to use a lane change logic based on the traffic and the length of the diverging lane.

When it is possible for the vehicle on which the apparatus is mounted to travel according to the basic principle, in operation 840, the apparatus may control a lane change. For example, the apparatus may generate a local path using the lane change logic and may control a lane change along the local path.

When it is impossible for the vehicle on which the apparatus is mounted to travel according to the basic principle, in operation 845, the apparatus may control the vehicle to travel along a lane link which faces the diverging lane. For example, the apparatus may control the vehicle to follow a lane link which connects a lane adjacent to the diverging lane with the diverging lane using a center following logic.

When there is the merging lane, in operation 850, the apparatus may determine a length of the merging lane. For example, the apparatus may determine the length of the merging lane using a length value of a lane link included in the precise map DB.

In operation 855, the apparatus may determine whether it is possible for the vehicle on which the apparatus is mounted to travel according to the basic principle. For example, the apparatus may determine whether to use the lane change logic based on the length of the merging lane.

When it is possible for the vehicle on which the apparatus is mounted to travel according to the basic principle, the apparatus may perform operation 840.

When it is impossible for the vehicle on which the apparatus is mounted to travel according to the basic principle, the apparatus may generate an additional lane link and may control the vehicle to travel along the additional lane link 860. For example, the apparatus may generate the additional lane link which connects the merging lane with the lane adjacent to the merging lane and may control the vehicle to follow the additional lane link using the center following logic.

Figure 9:
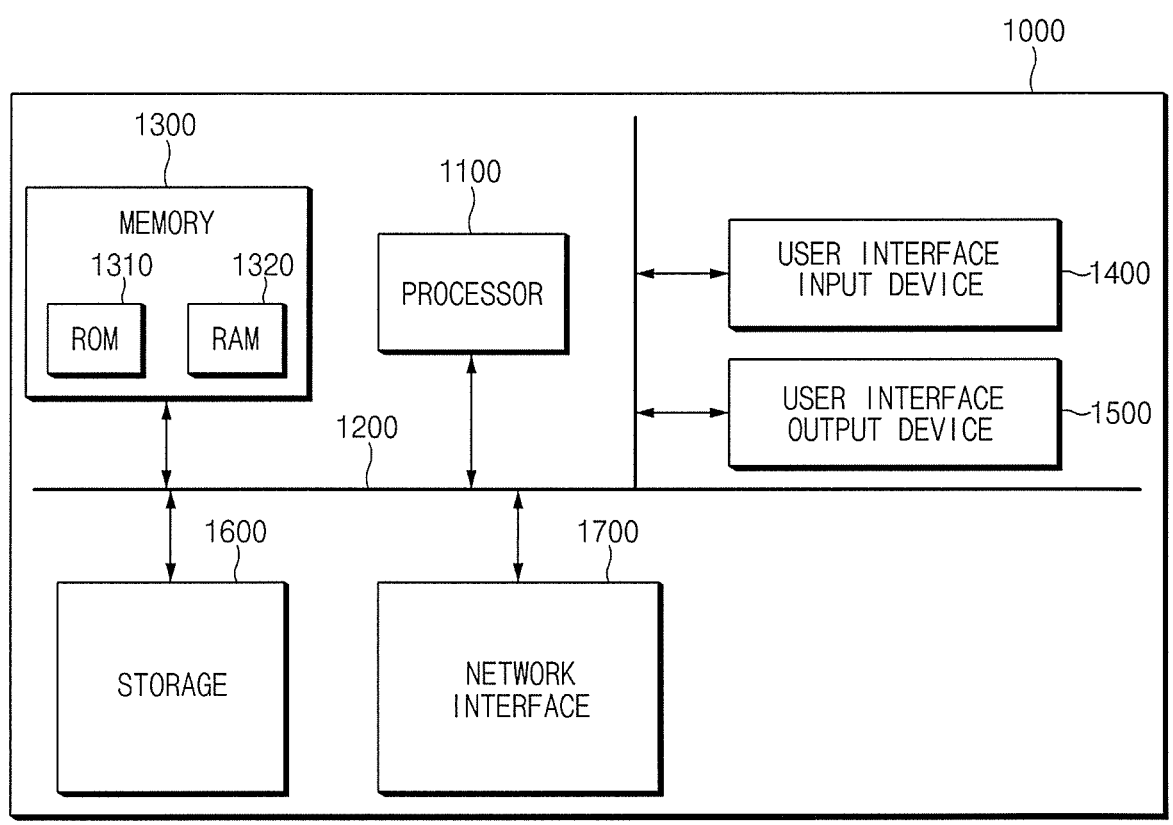
FIG. 9 is a block diagram illustrating a configuration of a computing system according to an embodiment of the present disclosure.

FIG. 9 is a block diagram illustrating a configuration of a computing system according to an embodiment of the present disclosure.

Referring to FIG. 9, the above-mentioned apparatus according to an embodiment of the present disclosure may be implemented through the computing system. A computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for executing processing of instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or combinations thereof, executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The apparatus for controlling the lane change in the vehicle according to an embodiment of the inventive concept may ensure safety of the user upon a lane change in a diverging section or a merging section by establishing a lane change strategy based on a length of a diverging lane or a length of a merging lane in a diverging section or a merging section.

Further, the apparatus for controlling the lane change in the vehicle according to an embodiment of the inventive concept may efficiently change a lane in a diverging section or a merging section by changing the lane using a lane link.

In addition, various effects indirectly or directly ascertained through the present disclosure may be provided.

While the present disclosure has been described with reference to exemplary embodiments, it will be apparent to those skilled in the art that various changes and modifications may be made without departing from the spirit and scope of the present disclosure.

Therefore, exemplary embodiments of the present disclosure are not limiting, but illustrative, and the spirit and scope of the present disclosure is not limited thereto. The spirit and scope and the present disclosure should be interpreted by the following claims, it should be interpreted that all technical ideas which are equivalent to the present disclosure are included in the spirit and scope of the present disclosure.

What is claimed is:

1. An apparatus for controlling a lane change in a vehicle, the apparatus comprising:
   a navigation device for providing a path from a starting point to a destination point;
   a global positioning system (GPS) device for obtaining location information of the vehicle;
   a non-transitory memory storing a precise map database (DB);
   a first sensor for obtaining information about a periphery of the vehicle;
   a second sensor for obtaining information about the vehicle; and
   a processor electrically connected with the navigation device, the GPS device, the memory, the first sensor, and the second sensor, and configured to:
      determine whether it is possible to control the vehicle to change a lane to a target lane in the path based on a length of a diverging lane in a diverging section included in the path or a length of a merging lane in a merging section included in the path;
      when it is possible to control the vehicle to change the lane using a lane change logic, control the vehicle to travel to the target lane; and
      when it is impossible to control the vehicle to change the lane using the lane change logic, generate a lane link connected with the target lane, wherein the generated lane link is not included in the precise map DB, and control the vehicle to travel along the generated lane link using a lane center following logic.

2. The apparatus of claim 1, wherein the processor is further configured to:
   determine the target lane based on the path and the precise map DB; and
   when the path is connected with the diverging lane or the merging lane, determine whether it is possible to control the vehicle to change the lane to the target lane.

3. The apparatus of claim 1, wherein, when the vehicle is located in the diverging section, the target lane is the diverging lane, and
   wherein, when the vehicle is located in the merging section, the target lane is a lane adjacent to the merging lane.

4. The apparatus of claim 1, wherein the processor is further configured to:
   when the vehicle is located in the diverging section, determine whether it is possible to control the vehicle to change the lane to the target lane based on the length of the diverging lane and traffic of the diverging lane.

5. The apparatus of claim 1, wherein the processor is further configured to:
   when the vehicle enters a section including the diverging lane and is located in the diverging section, and when it is possible to control the vehicle to change the lane, control the vehicle to travel from a lane adjacent to the diverging lane to the diverging lane.

6. The apparatus of claim 1, wherein the processor is further configured to:
   when the vehicle is located in the diverging section and when it is impossible to control the vehicle to change the lane, control the vehicle to travel along the lane link which connects a lane adjacent to the diverging lane with the diverging lane.

7. The apparatus of claim 1, wherein the processor is further configured to:
   when the vehicle is located in the merging section and when it is possible to control the vehicle to change the lane, control the vehicle to travel from the merging lane to a lane adjacent to the merging lane.

8. The apparatus of claim 1, wherein the processor is further configured to:
   when the vehicle is located in the merging section and when it is impossible to control the vehicle to change the lane, generate the lane link which connects the merging lane with a lane adjacent to the merging lane and control the vehicle to travel along the generated lane link, and
   wherein the target lane includes the lane adjacent to the merging lane.

9. The apparatus of claim 1, wherein the processor is configured to:
   determine whether it is possible to control the vehicle to change the lane to the target lane using the first sensor and the second sensor.

10. The apparatus of claim 1, wherein the first sensor comprises at least one of: a camera, a radar, or a light detection and ranging (LIDAR) device.

11. The apparatus of claim 1, wherein the second sensor comprises at least one of: an acceleration sensor, a yaw rate sensor, or a wheel speed sensor.

12. A method for controlling a lane change in a vehicle, the method comprising steps of:
   generating a path from a starting point to a destination point;
   determining, by a processor, whether it is possible to control the vehicle to change a lane to a target lane in the path based on a length of a diverging lane in a diverging section included in the path or a length of a merging lane in a merging section included in the path; and
   when it is possible to control the vehicle to change the lane, controlling, by the processor, the vehicle to travel to the target lane and, when it is impossible to control the vehicle to change the lane, generating, by the processor, a lane link connected with the target lane, wherein the generated lane link is not included in a precise map database (DB), and controlling, by the processor, the vehicle to travel along the generated lane link using a lane center following logic.

13. The method of claim 12, wherein the step of determining further comprises:

determining the target lane based on the path and the precise map DB; and when the path is connected with the diverging lane or the merging lane, determining whether it is possible to control the vehicle to change the lane to the target lane.

14. The method of claim 12, wherein, when the vehicle is located in the diverging section, the target lane is the diverging lane, and wherein, when the vehicle is located in the merging section, the target lane is a lane adjacent to the merging lane.

15. The method of claim 12, wherein the step of determining further comprises:

when the vehicle is located in the diverging section, determining whether it is possible to control the vehicle to change the lane to the target lane based on a length of the diverging lane and traffic of the diverging lane.

16. The method of claim 12, wherein the step of controlling the vehicle further comprises:

when the vehicle enters a section including the diverging lane and is located in the diverging section, and when it is possible to control the vehicle to change the lane, controlling the vehicle to travel from a lane adjacent to the diverging lane to the diverging lane.

17. The method of claim 12, wherein the step of controlling the vehicle further comprises:

when the vehicle is located in the diverging section and when it is impossible to control the vehicle to change the lane, controlling the vehicle to travel along the lane link which connects a lane adjacent to the diverging lane with the diverging lane, and wherein the target lane includes the diverging lane.

18. The method of claim 12, wherein the step of controlling the vehicle further comprises:

when the vehicle is located in the merging section and when it is possible to control the vehicle to change the lane, controlling the vehicle to travel from the merging lane to a lane adjacent to the merging lane.

19. The method of claim 12, wherein the step of controlling the vehicle further comprises:

when the vehicle is located in the merging section and when it is impossible to control the vehicle to change the lane, generating the lane link which connects the merging lane with a lane adjacent to the merging lane and controlling the vehicle to travel along the generated lane link, and wherein the target lane includes the lane adjacent to the merging lane.

20. The method of claim 12, wherein the step of determining further comprises:

determining whether it is possible to control the vehicle to change the lane to the target lane using sensing information about a periphery of the vehicle and sensing information about the vehicle.

* * * * *